UNITED STATES PATENT OFFICE.

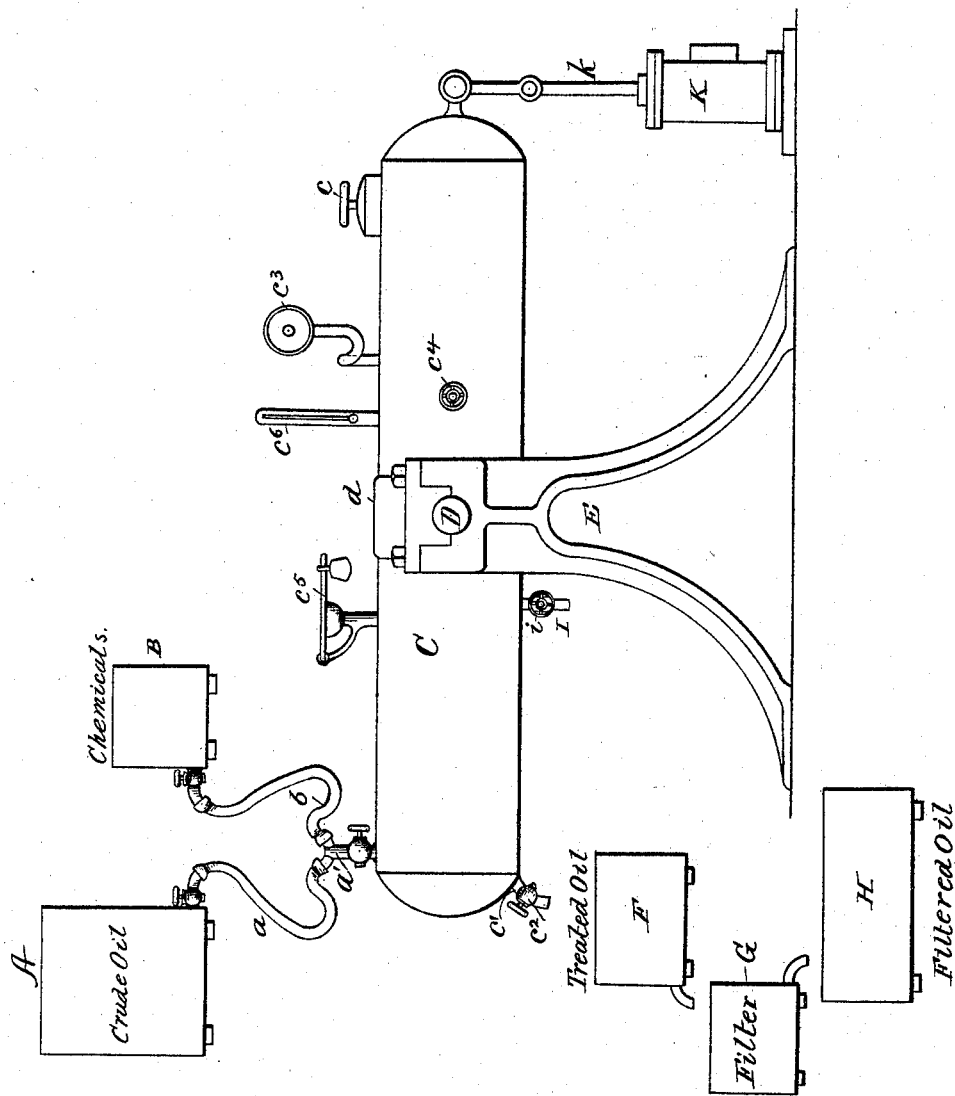

JOSEPH GLATZ, OF BROOKLYN, AND ORAZIO LUGO, OF NEW YORK, N. Y., ASSIGNORS TO THE INTERNATIONAL MAMBRINO CHEMICAL COMPANY, OF WASHINGTON, DISTRICT OF COLUMBIA.

REFINING GLYCERIDES AND PRODUCING GLYCERIN THEREFROM.

SPECIFICATION forming part of Letters Patent No. 585,844, dated July 6, 1897.

Application filed November 17, 1896. Serial No. 612,524. (No specimens.)

*To all whom it may concern:*

Be it known that we, JOSEPH GLATZ, of Brooklyn, and ORAZIO LUGO, of New York, in the State of New York, have invented new and useful Improvements in Treating and Refining Oils and Fats and Extracting Glycerin Therefrom, which are fully set forth in the following specification.

This invention relates to the art of treating vegetable oils and animal fats for the purpose of refining the same and obtaining various products therefrom.

Heretofore glycerin has been directly extracted from crude vegetable oils and animal fats by mixing the same with water and submitting such mixture to high temperature and great pressure, either with or without agitation; but the results obtained have invariably been unsatisfactory and without commercial utility because of the fact that the glycerin obtained contained a vast amount of impurities which could be only partially eliminated, while the high temperature employed charred the glycerin, thereby greatly injuring its value. Another serious objection was the expensive character of the boilers, coils, or digesters required to resist the enormous pressure generated by the high temperature employed. In addition to these objections the fatty acids remaining after the glycerin was extracted were of little or no value. So great have been the difficulties encountered in the direct extraction of glycerin from glycerin-bearing substances that, commercially, no glycerin is obtained by direct extraction, the glycerin of commerce being obtained almost entirely from spent soap-lyes and as a by-product in the manufacture of candles, and the glycerin thus recovered from the spent lyes has to be distilled and otherwise treated by expensive processes for purposes of purification, and even when so treated it is characterized by the presence of impurities, notably acrolein, which are in such intimate union with the glycerin that they cannot be effectually removed.

By the present invention the ordinary mode of procedure is reversed, first subjecting the crude oils or fats to a process of purification, using in this not a caustic alkali, but an earthy alkali. As the result of this treatment the impurities in the glyceride are rendered insoluble therein and may therefore be readily separated before the decomposition of the glyceride into glycerin and fatty acid, whereas the treatment with caustic alkalies, as in the manufacture of soap, decomposes the glyceride with the impurities present, and these impurities being soluble in the glycerin of the soap-lyes a chemical union of the glycerin and the impurities is formed, which renders them practically inseparable.

The invention, then, stated in its broad and generic sense, consists in treating a crude glyceride with an oxid of an alkaline earth, whereby the contained impurities are rendered insoluble, and then separating the insoluble matter so formed from the glyceride, and next in wholly or partially extracting the glycerin from the purified glyceride. If all the glycerin contained in the glyceride is extracted, pure glycerin and fatty acids are obtained as the products of the process, whereas if but a part of the glycerin is extracted pure glycerin and a partially-deglycerinized oil or fat are obtained.

In the preferred mode of carrying the invention into effect a crude glyceride, such as cotton-seed oil, is mixed with an oxid of an alkaline earth, preferably lime, and the mixture subjected to the action of impact and agitation, forming an emulsion, which emulsion is then heated, preferably with live steam. The impurities having been rendered insoluble by the treatment received are eliminated by filtration. The purified oil is then mixed with water in proportions of about three parts of oil to one of water and this mixture subjected to the action of agitation and impact to form an emulsion and the emulsion then heated during continued agitation and impaction, as before. This latter operation may be continued until the oil has become totally decomposed and separated into glycerin and fatty acids, or it may be arrested when but a portion of the glycerin has been extracted, leaving a partially-deglycerinized oil. The glycerin-water is now separated from the fatty acids and concentrated, preferably by evaporating the water in a vacuum-pan.

To accomplish fully the results described, it is important to secure intimacy of contact between the particles of oil and of water in a degree which cannot be effected by the ordinary methods of stirring or agitation. Unless such intimacy of contact be obtained the decomposition will not take place without resort to great heat and pressure, which it is one of the objects of this invention to avoid.

It has been discovered that the close intimacy of contact essential to the end in view may be effected by subjecting the mass both to agitation or stirring, whereby commingling of the particles is effected, as usual, and to impact, whereby the commingled particles are brought into close union, as the result of which the oil decomposes rapidly at a low temperature and with little or no pressure. By "impact," as herein used, is meant a violent shock, concussion, or blow (or, rather, a series of shocks, concussions, or blows) produced in or upon the mass, as can be most effectively obtained by arresting the whole mass suddenly when in rapid motion.

In producing the emulsion of the crude oil and the alkaline earth in the first step of the process it is likewise of importance to produce both a thorough commingling and a close intimacy of contact between the particles of the two materials, and to this end agitation or stirring and impact are also employed in that part of the operation. This treatment produces as its result a true emulsion, wherein each globule of the glyceride is brought into contact with a particle of the reagent.

A convenient form of apparatus for use in carrying this invention into effect is shown in the accompanying drawing, in which a side elevation of the apparatus is illustrated.

In the drawing, A represents a storage-tank for the crude oil to be treated, and B represents a wooden or iron tank designed to be used to mix or prepare the chemical reagents to be used in the treatment of the crude oil.

C represents a cylindrical agitator or digester, to which the tanks A and B are connected by pipes $a$ and $b$ and the pipe $a'$, each pipe having a cock therein. The agitator or digester is provided on opposite sides with trunnions D, attached to the agitator or digester by a band $d$, and these trunnions rest in suitable bearings in the upper portion of supports E. A rocking motion is given the agitator or digester through a reciprocating piston $k$ of the engine K. The agitator or digester is provided with a manhole $c$, a discharge-pipe $c'$, and a stop-cock $c^2$, with a steam-pipe I, having therein a check-valve $i$, the valve being arranged to allow the inlet of steam to the digester and to prevent the outlet of fluid therefrom. It also has attached to it a pressure-gage $c^3$, a test-cock $c^4$, a safety-valve $c^5$, and a thermometer $c^6$.

Arranged adjacent to the discharge-pipe $c'$ is a tank F, into which the oil is discharged from the agitator after treatment. The tank F has a discharge-nozzle provided with a cock through which the oil passes to a separator G. This separator may be a filter. Placed in a convenient position to receive the oil, after separation from the insoluble matter contained is removed, is a storage-tank H.

It will be clear from an understanding of the apparatus described and of the procedure to be explained that the apparatus may be of any desired capacity, provided the length of the agitator or digester is sufficiently great to allow the mass of oil being treated to acquire a considerable momentum in going from one end of the digester to the other. This is of importance, because upon the momentum thus acquired depends the violence of the impact of the mass against the ends of the digester, as a more perfect emulsion is obtained where the mixture is subjected to both impact and agitation than where agitation without impact is resorted to. For this reason it is preferred that the digester be of great capacity, say from five thousand to seven thousand gallons, in order that a large mass of oil may be treated, thereby obtaining great momentum and hence very violent impact. The effect of impact is also of great importance when decomposing the purified glycerides in the second step of the process.

The apparatus may be used to purify cotton-seed oil according to this invention, the procedure being as follows: The crude oil is placed in the tank A and the chemical reagent to be used is dissolved or placed in condition for use in the tank B. When, for instance, caustic lime, which is essentially adapted for the purpose, is the reagent used, it is preferably prepared in a very thin milk of lime, taking, approximately, one pound of quicklime to five gallons of water. In the first treatment of crude vegetable oil the latter is allowed to flow from the tank A into the agitator or digester until the latter is partially filled—for instance, until about four-tenths, more or less, of the entire tank is filled—and then the milk of lime, when that is employed, is admitted. The quantity of milk of lime used should be the chemical equivalent of the free fatty acids contained in the glyceride under treatment. With crude cotton-seed oil the quantity of milk of lime made, as hereinbefore mentioned, should be about one-half that of the oil, leaving sufficient space in the agitator or digester for the free movement of the mixture and to allow the two substances thoroughly to commingle. Care should be exercised in adding the alkali not to exceed the chemical equivalent of the free fatty acids in the glyceride under treatment, as, if such excess occurs, the oil will be to a certain extent decomposed and glycerin formed. When the mixture is made, the agitator is put into motion and this is continued until, as a result of the joint action of impact and agitation, an entirely homogeneous mixture is accomplished—that is, to bring each molecule of oil into contact with the water and chemical reagent. When this step in the process has been completed, steam is admitted into the digester through the pipe I until the temperature of the mass of liquids is about 220° Fahrenheit and kept in the neighborhood of that degree until the oxid of the alkaline earth used has entered into combination with the free fatty acids found in the crude oil, as well as with the resinous coloring-matter, rendering them insoluble. It is understood that the digester C is always kept in motion during the admission of the steam in order to accelerate the operation, as well as to obtain the best results possible as to the purification of the oil under treatment. The time required for this manipulation depends on the quantity and quality of the crude oil worked upon; but as a general rule in ordinary crude oils in about one hour the operation is completed. At this point the steam is cut off, the digester is stopped rocking, and preferably retained in a horizontal position. The cock of the pipe is now opened and the mass allowed to flow into tank F, and when it is ascertained at the pressure-gage $c^3$ that there is no more pressure in the digester air is allowed to enter the vessel, thus preventing the formation of a vacuum. The same manipulation or process is repeated, as herein stated, for the subsequent charges.

The clear oil and insoluble coloring-matter in the tank F are separated from each other either by filtration in a tank with a false bottom or with a centrifugal machine G.

The filtered oil is collected in a reservoir at H and there stored to be packed for shipment or to be used in the next step of the process for the production or direct extraction of glycerin.

The purified cotton-seed oil may be manufactured into soap or other similar commercial products, or it may for the purpose of extracting glycerin therefrom be submitted to the conjoint action of heat, water, impact, and agitation in a manner similar to that hereinabove described.

As hereinbefore stated, the decomposition of the glyceride is materially facilitated by the impact of the large volume of oil and water against the ends of the digesters during their rocking motion, and it is in order that this action of impact may be rendered possible that considerable empty space is left in the digester after the oil and water are placed there, as hereinafter stated. It is desirable that the treatment of the water and oil by agitation and impact should precede the application of heat, and this part of the invention is carried into effect substantially as follows: The refined oil collected in the tank H is pumped into the digester C, or preferably into another one similarly constructed, to about forty-five per cent. of its capacity, and about fifteen per cent. of water is added, leaving an empty space of about forty per cent. The digester is set rocking in order to produce a practically homogeneous emulsion of the oil and water, the steam is let into the digester C by the pipe I, and the temperature of the mixture raised to the required degree for the decomposition of the oil and the production of glycerin. The temperature need not be higher than 300° Fahrenheit. The operation is continued, preferably, until about eighty per cent. of the glycerin contained in the oil is separated, and whether this has been accomplished or not can be ascertained by taking from time to time a sample of the mixture from the test-cock $c^4$. As soon as the desired result is obtained the steam is shut off, the digester stopped from rocking, and its contents discharged into a vessel. The oil and the glycerin solution easily separate from each other and can be decanted. The glycerin liquor obtained by this process is colorless and pure, and therefore when concentrated to the required density the glycerin produced is sufficiently pure to be used in the arts and well adapted for the manufacture of high explosives without the necessity of resorting to distillation.

Oxid of calcium has been mentioned as an example of the alkaline earth employed, but similar results have been obtained with the oxids of magnesium and strontium and the oxyhydrate of aluminium, and with a mixture of these oxids of the alkaline earths.

The amount of oxids to be used to form the chemical equivalent of the various glycerides may easily be determined in the laboratory from a sample of the glycerides to be operated on a large scale. The hydrous saponification may continue until complete deglycerination is reached. In this case solidifiable fatty ethers are produced, and these can be used for culinary purposes.

It is to be understood that the invention is not limited in its application to cotton-seed oil, as above described, for it has been found that all other vegetable oils, as well as animal fats, such as tallow, can be operated upon in a similar manner, as herein described—that is, by purifying the glyceride by treatment with an alkaline earth and then subjecting the glyceride to the the action of agitation, water, impact, and heat. A direct extraction of pure glycerin can be economically obtained during the decomposition of any of the glycerides known.

In the treatment of animal fats a slight modification of the process employed for vegetable oils is desirable. The first step of the process may be dispensed with, and instead of it the fats may be rendered by the usual method. In case, however, a very pure product is required, the fats or glycerin-bearing substance may be submitted to the first or purifying step of the process, when a white and odorless fat will be obtained. The purified fat or tallow is then submitted to the second step of the process—that is to say, to that part in which the fat is decomposed and glycerin is produced by the joint action of agitation, water, impact, and heat. After treatment the mixture coming from the digester will consist of pure white odorless fatty ethers or acids and a colorless solution of glycerin. The latter is condensed in the usual method and the fatty acids made, if desirable, into soap, candles, &c. In neutralizing the free fatty acids in the first step of the process an excess of earthy alkali should be avoided, because such excess would decompose some of the glyceride to set free additional fatty acid, and in so doing also liberate glycerin, which should not be done until the impurities have been removed.

Having thus described the invention, what is claimed as new, and desired to be secured by Letters Patent, is—

1. The process of treating glycerides which consists in forming an emulsion of the glyceride and an alkaline earth by the combined action of agitation and impact, and then heating the emulsion during continued agitation and impaction, substantially as described.

2. The process of treating animal fats and vegetable oils which consists in adding a reagent and forming an emulsion by the combined action of agitation and impact, and heating slightly above the boiling-point of water, substantially as described.

3. The process of treating glycerides which consists in adding to the glyceride a neutralizing reagent in quantity sufficient to form the chemical equivalent of the free fatty acids of the glyceride, forming an emulsion and then heating the mass to a point slightly above 212° Fahrenheit, substantially as described.

4. The process of treating glycerides which consists in adding to the glyceride an oxid of an alkaline earth, agitating the mass to form an intimate homogeneous emulsion, and then heating the emulsion slightly above the boiling-point of water, during continued agitation, substantially as described.

5. The process of extracting glycerin from glycerides, which consists in first forming an emulsion of the glyceride with an alkaline earth, the latter being used in such quantity as to neutralize all free fatty acids present and to avoid decomposition of the glyceride, eliminating the insoluble matter and then separating the glycerin from the fatty acids of the glyceride, substantially as described.

6. The process of extracting glycerin from glycerin-bearing substances, which consists in neutralizing the free fatty acids, removing the same and other impurities from the glyceride, and then decomposing the glyceride into fatty acids and glycerin, substantially as described.

7. The process of extracting glycerin from glycerin-bearing substances which consists in mixing the latter with water, subjecting the mixture to the combined action of agitation and impact in the presence of heat, substantially as described.

8. The process of extracting glycerin from crude glycerides, which process consists in forming an emulsion of the glyceride with an alkaline earth, thereby forming insoluble compounds of the foreign bodies, removing the latter, thoroughly mixing the glyceride with water, so as to bring the particles of glyceride and of water into intimate contact, and subjecting the commingled mass to the action of heat, thereby separating the glycerin from the fatty acids, substantially as described.

9. The process of extracting glycerin from glycerin-bearing substances which consists in treating the glycerides with an oxid of an alkaline earth in a quantity sufficient to form the chemical equivalent of the free fatty acids in the glyceride, during the combined action of agitation, impact and heat, then eliminating the impurities by filtration, then mixing the purified glyceride with water and forming a hydrous saponification by impact and agitation during the application of heat, substantially as described.

10. The process of extracting glycerin from glycerin-bearing substances which consists in removing the impurities from the glyceride, then forming a hydrous saponification by the action of impact, agitation and heat, substantially as described.

In testimony whereof we have signed this specification in the presence of two subscribing witnesses.

JOS. GLATZ.
ORAZIO LUGO.

Witnesses:
  REEVE LEWIS,
  S. T. CAMERON.